United States Patent
Toshioka et al.

(10) Patent No.: US 8,117,834 B2
(45) Date of Patent: Feb. 21, 2012

(54) EXHAUST PURIFICATION DEVICE OF INTERNAL COMBUSTION ENGINE

(75) Inventors: Shunsuke Toshioka, Susono (JP);
Tomihisa Oda, Numazu (JP); Takekazu Itoh, Toyota (JP); Yutaka Tanai, Susono (JP); Satoshi Watanabe, Sunto-gun (JP); Yoshitaka Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 506 days.

(21) Appl. No.: 12/309,281

(22) PCT Filed: Apr. 23, 2008

(86) PCT No.: PCT/JP2008/058297
§ 371 (c)(1),
(2), (4) Date: Jan. 13, 2009

(87) PCT Pub. No.: WO2008/133341
PCT Pub. Date: Nov. 6, 2008

(65) Prior Publication Data
US 2010/0037599 A1    Feb. 18, 2010

(30) Foreign Application Priority Data

Apr. 25, 2007 (JP) ................................ 2007-115848
Dec. 26, 2007 (JP) ................................ 2007-335155

(51) Int. Cl.
*F01N 3/00* (2006.01)
(52) U.S. Cl. ............... 60/301; 60/286; 60/295; 60/297; 60/303

(58) Field of Classification Search .............. 60/286, 60/295, 274, 277, 297, 301, 303
See application file for complete search history.

(56) References Cited

U.S. PATENT DOCUMENTS

| 5,651,247 | A  | * | 7/1997 | Frankle ........................ 60/274 |
| 6,519,935 | B2 | * | 2/2003 | Weigl ........................... 60/286 |
| 7,017,335 | B2 | * | 3/2006 | Huber et al. ................... 60/286 |
| 7,610,750 | B2 | * | 11/2009 | Viola et al. .................... 60/286 |

(Continued)

FOREIGN PATENT DOCUMENTS

CA    2 538 779    3/2005
(Continued)

OTHER PUBLICATIONS

European Search Report issued in European Patent Application No. 08740965.2.

*Primary Examiner* — Binh Q Tran
(74) *Attorney, Agent, or Firm* — Oliff & Berridge, PLC

(57) ABSTRACT

In an internal combustion engine, an NOx selective reduction catalyst is arranged in the engine exhaust passage and a urea aqueous solution stored in a urea aqueous solution tank is fed to the NOx selective reduction catalyst where the NOx is selectively reduced. Opening and closing of the urea aqueous solution refill port of the urea aqueous solution tank are detected and it is judged if the urea aqueous solution is refilled in the urea aqueous solution tank. When it is judged that the NOx purification rate has fallen to an allowable level or less at the time of engine operation right after the urea aqueous solution is refilled in the urea aqueous solution tank, it is judged that the refilled urea aqueous solution is abnormal.

14 Claims, 15 Drawing Sheets

U.S. PATENT DOCUMENTS

| | | |
|---|---|---|
| 7,647,767 B2 * | 1/2010 | Osaku et al. .................. 60/286 |
| 7,954,312 B2 * | 6/2011 | Gresens ........................ 60/286 |
| 2007/0163240 A1 | 7/2007 | Nishina et al. |
| 2007/0204677 A1 | 9/2007 | Nishina et al. |
| 2007/0266697 A1 | 11/2007 | Nishina et al. |
| 2007/0266703 A1 | 11/2007 | Hirata et al. |
| 2010/0083636 A1 | 4/2010 | Wang et al. |

FOREIGN PATENT DOCUMENTS

| | | |
|---|---|---|
| DE | 10 2006 033 476 A1 | 1/2008 |
| EP | 1 681 443 A1 | 7/2006 |
| JP | A-2002-371831 | 12/2002 |
| JP | A-2003-314258 | 11/2003 |
| JP | A-2005-83223 | 3/2005 |
| JP | A-2005-84025 | 3/2005 |
| JP | A-2005-133541 | 5/2005 |
| JP | A-2005-133695 | 5/2005 |
| JP | A-2006-2663 | 1/2006 |
| JP | A-2006-9606 | 1/2006 |
| JP | A-2006-177317 | 7/2006 |
| JP | A-2006-250117 | 9/2006 |
| WO | WO 01/38704 A1 | 5/2001 |
| WO | WO 2010/125725 A1 | 11/2010 |

* cited by examiner

Fig.3
(A)
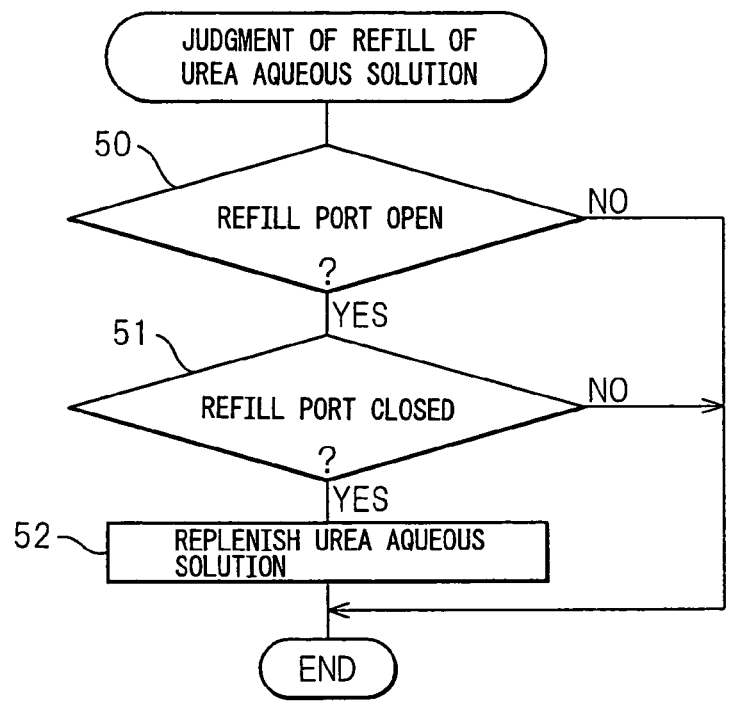
(B)
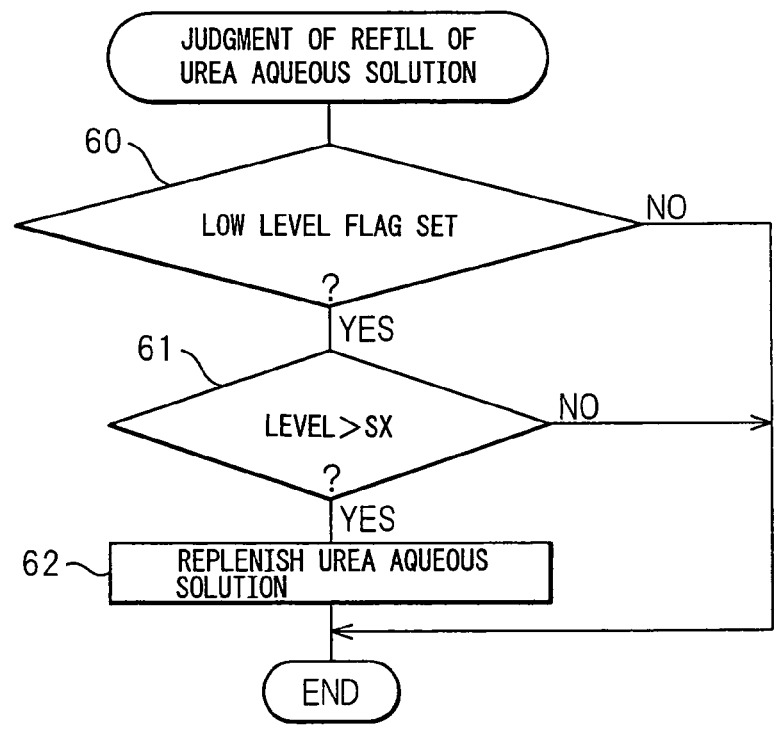

Fig.14
(A)
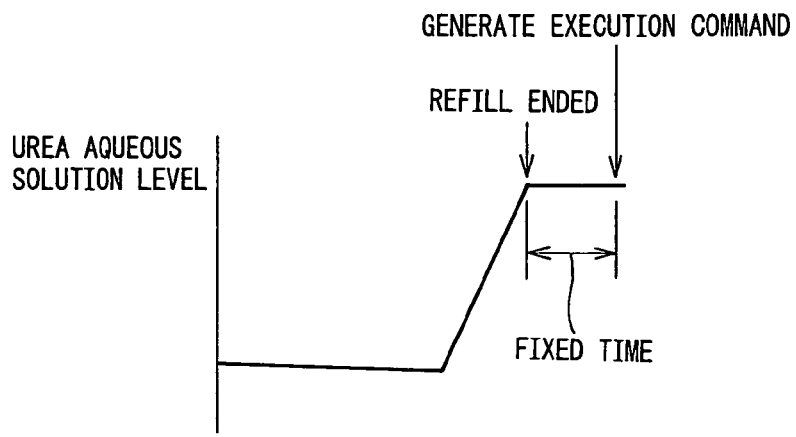
(B)
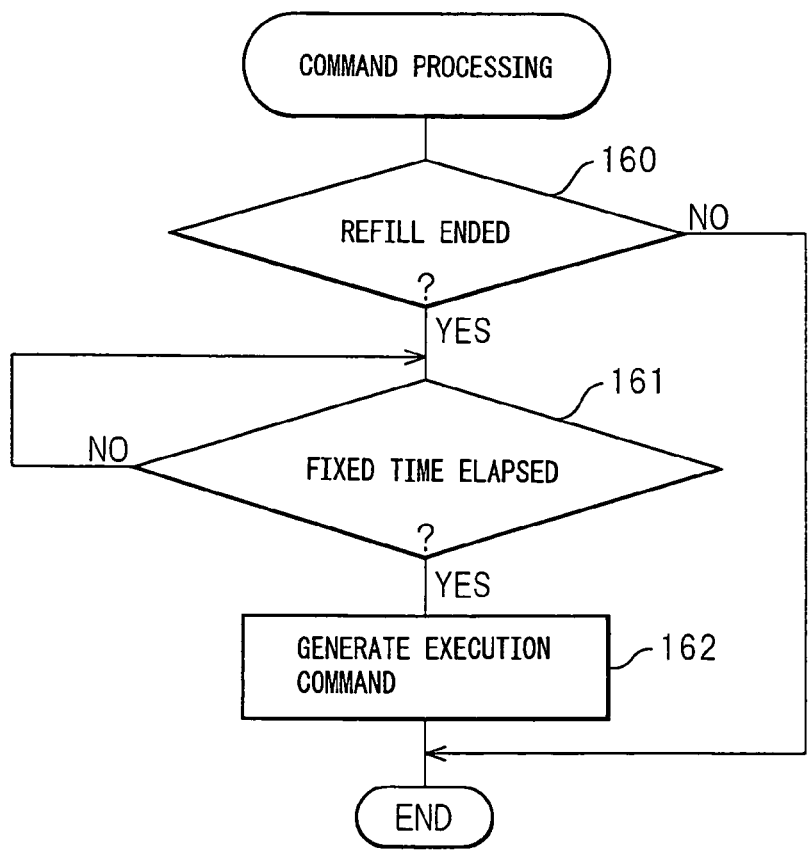

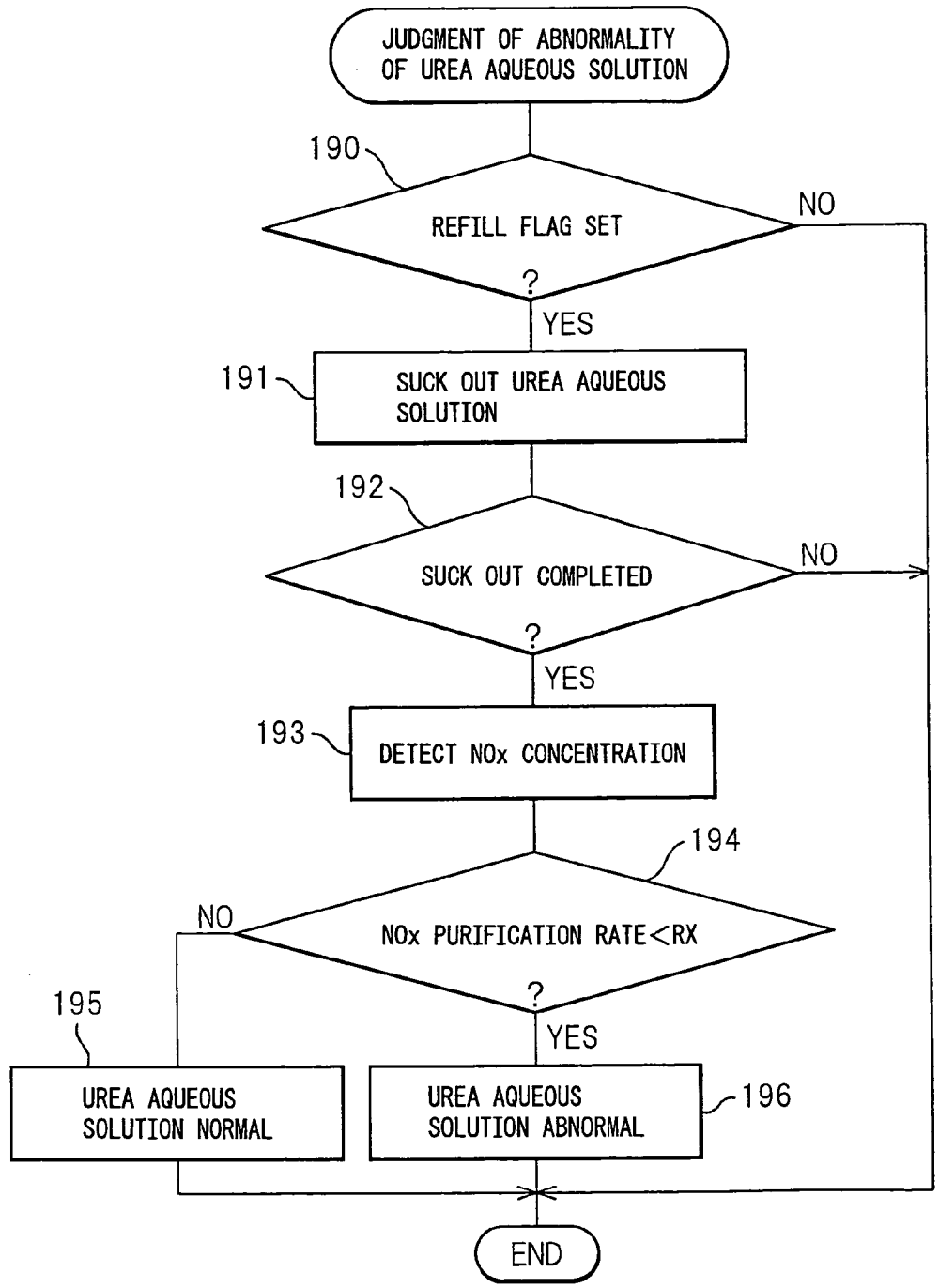

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging an NOx selective reduction catalyst in an engine exhaust passage, feeding an urea aqueous solution stored in an urea aqueous solution tank to the $NO_x$ selective reduction catalyst, and using the ammonia produced from the urea aqueous solution to selectively reduce the $NO_x$ contained in the exhaust gas, in which internal combustion engine a urea aqueous solution concentration sensor is arranged in the urea aqueous solution tank for detecting an abnormality of the urea aqueous solution (for example, see Japanese Patent Publication (A) No. 2005-83223).

However, this urea aqueous solution concentration sensor is expensive. It is desirable to use another more inexpensive method.

DISCLOSURE OF THE INVENTION

An object of the present invention is to provide an exhaust purification device of an internal combustion engine able to detect an abnormality in a urea aqueous solution inexpensively and reliably.

According to the present invention, there is provided an exhaust purification device of an internal combustion engine arranging an $NO_x$ selective reduction catalyst in an engine exhaust passage, feeding a urea aqueous solution stored in a urea aqueous solution tank to the $NO_x$ selective reduction catalyst, and using ammonia produced from the urea aqueous solution to selectively reduce $NO_x$ contained in an exhaust gas, wherein urea aqueous solution refill judging means for judging if the urea aqueous solution has been refilled in the urea aqueous solution tank and $NO_x$ purification rate judging means for judging if the $NO_x$ purification rate has fallen to an allowable level or less are provided and, when it is judged that the $NO_x$ purification rate has fallen to the allowable level or less at the time of engine operation right after the urea aqueous solution has been refilled in the urea aqueous solution tank, it is judged that the refilled urea aqueous solution is abnormal.

An abnormality of the urea aqueous solution, that is, a drop in concentration of the urea aqueous solution, for example, mainly occurs when a nonstandard urea aqueous solution is refilled or a liquid other than a urea aqueous solution is refilled. On the other hand, a drop in concentration of the urea aqueous solution is expressed as a drop in the $NO_x$ purification rate at the time of engine operation. Therefore, it is possible to detect an abnormality of the urea aqueous solution from a drop in the $NO_x$ purification rate at the time of engine operation right after the urea aqueous solution is refilled and therefore possible to detect an abnormality of the urea aqueous solution by an inexpensive method.

BRIEF DESCRIPTION OF THE DRAWINGS

FIGS. 3(A) and 3(B) are flow charts for judging if a urea aqueous solution has been refilled, FIGS. 14(A) and 14(B) are flow charts for performing level detection execute processing etc., FIG. 17 is a flow chart for judging an abnormality of a urea aqueous solution.

BEST MODE FOR CARRYING OUT THE INVENTION

Figure 1:
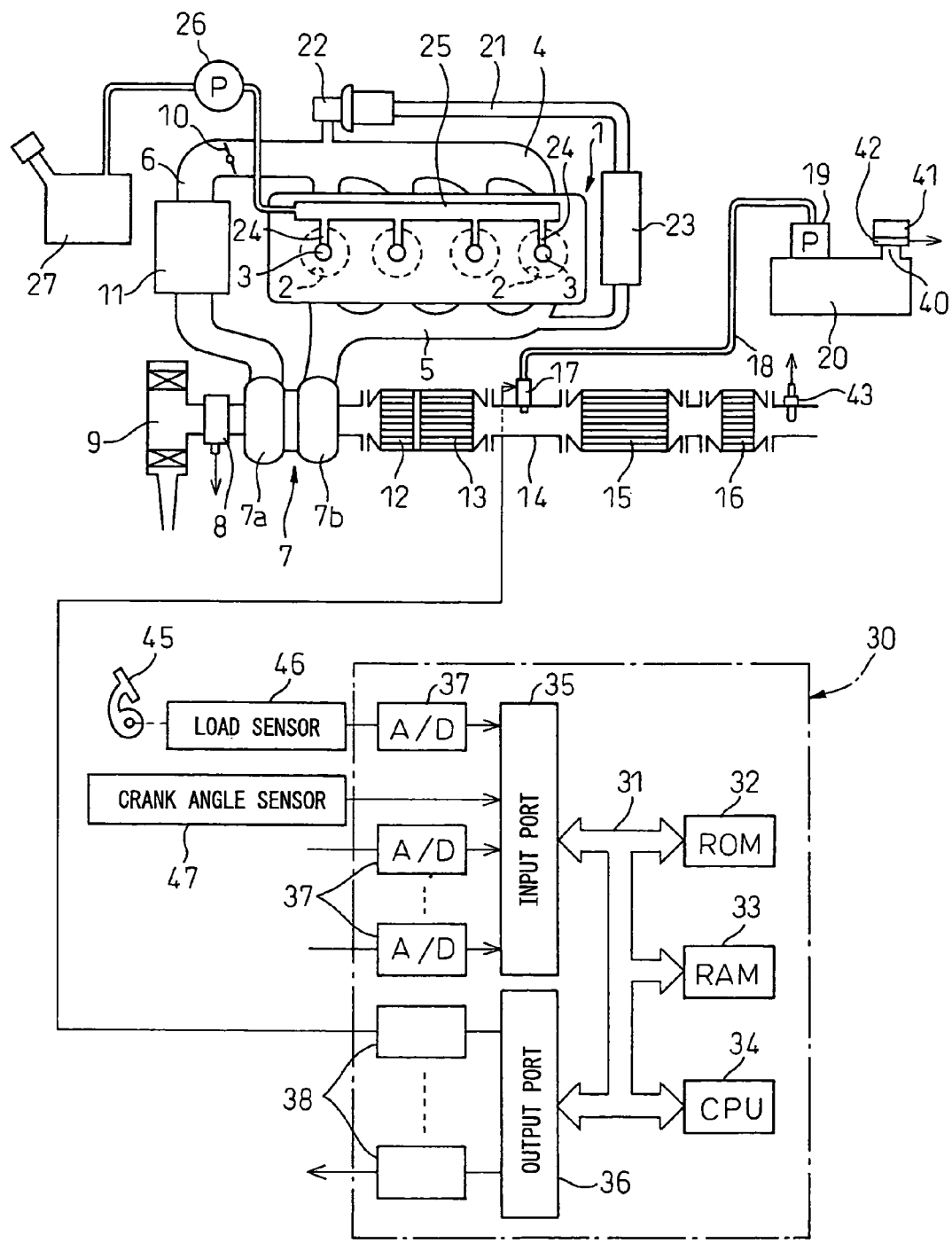
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an oxidation catalyst 12. Downstream of the oxidation catalyst 12, a particulate filter 13 is arranged adjacent to the oxidation catalyst 12 for collecting particulate matter contained in the exhaust gas, while the outlet of this particulate filter 13 is connected through an exhaust pipe 14 to the inlet of an $NO_x$ selective reducing catalyst 15. The outlet of this $NO_x$ selective reducing catalyst 15 is connected to an oxidation catalyst 16.

Inside an exhaust pipe 14 upstream of the $NO_x$ selective reducing catalyst 15, an aqueous urea solution feed valve 17 is arranged. This aqueous urea solution feed valve 17 is connected through a feed pipe 18 and a feed pump 19 to an aqueous urea solution tank 20. The aqueous urea solution stored inside the aqueous urea solution tank 20 is injected by the feed pump 19 into the exhaust gas flowing from the aqueous urea solution feed valve 17 inside the exhaust pipe 14, while the ammonia (($NH_2)_2CO+H_2O \rightarrow 2NH_3+CO_2$) generated from urea causes the $NO_x$ contained in the exhaust gas to be reduced in the $NO_x$ selective reducing catalyst 15.

The exhaust manifold 5 and the intake manifold 4 are connected to each other through an exhaust gas recirculation (hereinafter referred to as the "EGR") passage 21. Inside the EGR passage 21 is arranged an electronic control type EGR control valve 22. Further, around the EGR passage 21 is arranged a cooling device 23 for cooling the EGR gas flowing through the inside of the EGR passage 21. In the embodiment shown in FIG. 1, the engine cooling water is guided through the cooling device 23, where the engine cooling water is used to cool the EGR gas. On the other hand, each fuel injector 3 is connected through a fuel feed pipe 24 to a common rail 25. This common rail 25 is connected through an electronically controlled variable discharge fuel pump 26 to a fuel tank 27. The fuel stored in the fuel tank 27 is fed by the fuel pump 26 into the common rail 25, and the fuel fed to the inside of the common rail 25 is fed through each fuel pipe 24 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31.

In the present invention, a urea aqueous solution refill judging means is provided inside the urea aqueous solution tank 20 for judging if the urea aqueous solution has been refilled. In the embodiment shown in FIG. 1, this urea aqueous solution refill judging means is comprised of a switch 42 turning on when a cap 41 attached to a urea aqueous solution refill port 40 of the fuel tank 20 has been removed. An on/off signal of this switch 42 is input to the input port 35.

Furthermore, in the present invention, an $NO_x$ purification rate judging means is provided for judging if the $NO_x$ purification rate has fallen to an allowable level or less. In the embodiment shown in FIG. 1, this $NO_x$ purification rate judging means is comprised of an $NO_x$ concentration sensor 43 arranged downstream of the oxidation catalyst 16. This $NO_x$ concentration sensor 43 generates an output proportional to the $NO_x$ concentration in the exhaust gas. This output of the $NO_x$ concentration sensor 43 is input through the corresponding AD converter 37 to the input port 35.

On the other hand, the output signal of the intake air amount detector 8 is input through the corresponding AD converter 37 to the input port 35. Further, the accelerator pedal 45 is connected to a load sensor 46 generating an output voltage proportional to the amount of depression L of the accelerator pedal 45. The output voltage of the load sensor 46 is input through the corresponding AD converter 37 to the input port 35. Furthermore, the input port 35 is connected to a crank angle sensor 47 generating an output pulse every time the crankshaft rotates by for example 15°. On the other hand, the output port 36 is connected through the corresponding drive circuits 38 to the fuel injector 3, the step motor for driving the throttle valve 10, the urea aqueous solution feed valve 17, the feed pump 19, the EGR control valve 22, and the fuel pump 26.

The oxidation catalyst 12 for example carries a precious metal catalyst such as platinum. This oxidation catalyst 12 acts to convert the NO contained in the exhaust gas to $NO_2$ and acts to oxidize the HC contained in exhaust gas. That is, $NO_2$ is more oxidizable than NO, therefore if NO is converted to $NO_2$, the oxidation reaction of the particulate matter trapped on the particulate filter 13 is promoted and, further, the reduction reaction by the ammonia at the $NO_x$ selective reduction catalyst 15 is promoted. As the particulate filter 13, a particulate filter not carrying any catalyst can be used. For example, a particulate filter carrying a precious metal catalyst such as platinum can also be used. On the other hand, the $NO_x$ selective reduction catalyst 15 can be comprised from an ammonia adsorption type Fe zeolite having a high $NO_x$ purification rate at a low temperature and can be comprised from a titania-vanadium-based catalyst having no ammonia-adsorption function. The oxidation catalyst 16 for example carries a precious metal catalyst comprised of platinum. This oxidation catalyst 16 acts to oxidize the ammonia leaking out from the $NO_x$ selective reduction catalyst 15.

Figure 2:
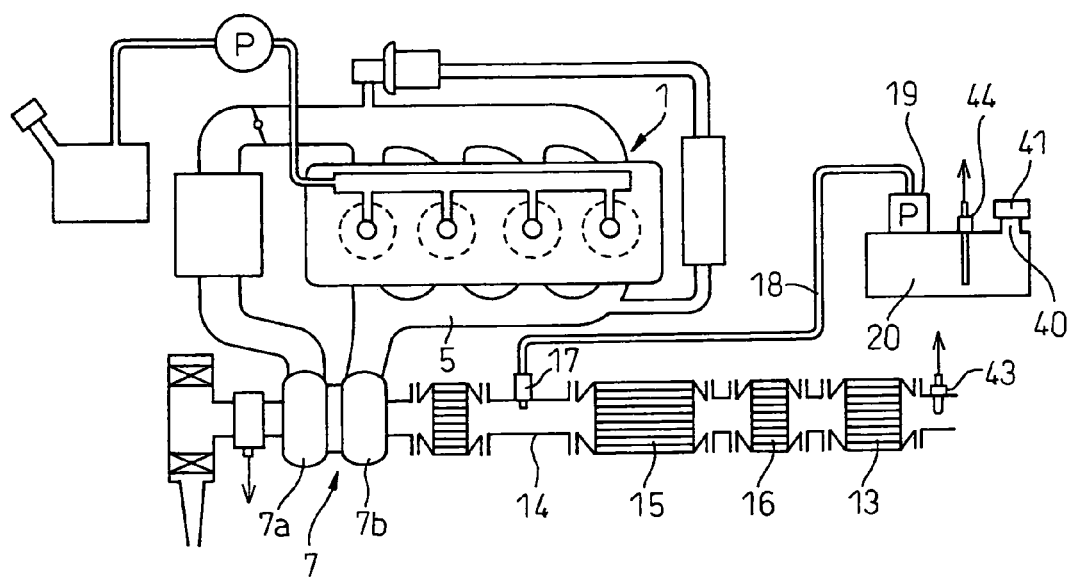
FIG. 2 is an overview showing another embodiment of a compression ignition type internal combustion engine.

FIG. 2 shows another embodiment of a compression ignition type internal combustion engine. In this embodiment, the urea aqueous solution refill judging means for judging if the urea aqueous solution has been refilled in the urea aqueous solution tank 20 is comprised of a level sensor 44 arranged in the urea aqueous solution tank 20. This level sensor 44 generates an output corresponding to the liquid level of the urea aqueous solution in the urea aqueous solution tank 20. Further, in this embodiment, the particulate filter 13 is arranged downstream of the oxidation catalyst 16. Therefore, in this embodiment, the outlet of the oxidation catalyst 12 is connected through the exhaust pipe 14 to the inlet of the $NO_x$ selective reduction catalyst 15.

Now, as explained above, abnormalities of the urea aqueous solution mainly occur for example when a nonstandard urea aqueous solution is used or a liquid other than an urea aqueous solution is illicitly used. On the other hand, the $NO_x$ purification rate at the time of engine operation can be detected by an inexpensive method. Therefore, in the present invention, urea aqueous solution refill judging means for judging if the urea aqueous solution has been refilled in the urea aqueous solution tank 20 and $NO_x$ purification rate judging means for judging if the $NO_x$ purification rate has fallen to an allowable level or less and, when it is judged that the $NO_x$ purification rate has fallen to the allowable level or less at the time of engine operation right after the urea aqueous solution has been refilled in the urea aqueous solution tank 20, it is judged that the refilled urea aqueous solution is abnormal.

In this case, in the embodiment shown in FIG. 1, it is judged that the urea aqueous solution has been refilled when the opening and closing of the urea aqueous solution refill port 40 of the urea aqueous solution tank 20 have been detected and the urea aqueous solution refill port 40 has been opened and closed. As opposed to this, in the embodiment shown in FIG. 2, the liquid level of the urea aqueous solution in the urea aqueous solution tank 20 is detected, and when the liquid level of the urea aqueous solution rises from a predetermined low level or less and exceeds a predetermined refill completion level, it is judged that the urea aqueous solution has been refilled.

Next, the routine for judgment of the urea aqueous solution refill for judging if the urea aqueous solution has been refilled will be explained. FIG. 3(A) shows the routine for judgment of the urea aqueous solution refill performed in the embodiment shown in FIG. 1, while FIG. 3(B) shows the routine for judgment of the urea aqueous solution refill performed in the embodiment shown in FIG. 2.

Referring to the routine for judgment of urea aqueous solution refill shown in FIG. 3(A), first, at step 50, it is judged if the switch 42 has become on, that is, if the urea aqueous solution refill port 40 has been opened. When the urea aqueous solution refill port 40 has been opened, the routine proceeds to step 51 where it is judged if the switch 42 has turned from on to off, that is, if the urea aqueous solution refill port 40 has been closed. When the urea aqueous solution refill port 40 has been closed, the routine proceeds to step 52. That is, when the urea aqueous solution refill port 20 has been closed after opened, it is probable that the urea aqueous solution has been refilled, so the routine proceeds to step 52 where it is judged that the urea aqueous solution has been refilled.

Next, if explaining the routine for judgment of the urea aqueous solution refill shown in FIG. 3(B), in this example, when the liquid level in the urea aqueous solution tank 20 has fallen below a predetermined low level, a low level flag is set based on the output signal of the level sensor 44. At step 60, it is judged if this low level flag is set. When the low level flag is set, the routine proceeds to step 61 where the level sensor 44 judges if the liquid level has exceeded a refill completion level SX where it is estimated that refill has been completed. When the liquid level has exceeded the refill completion level SX, the routine proceeds to step 62. That is, when the previously low level liquid level rises over the refill completion level, probably the urea aqueous solution has been refilled during that time, so the routine proceeds to step 62 where it is judged that the urea aqueous solution has been refilled.

Figure 4:
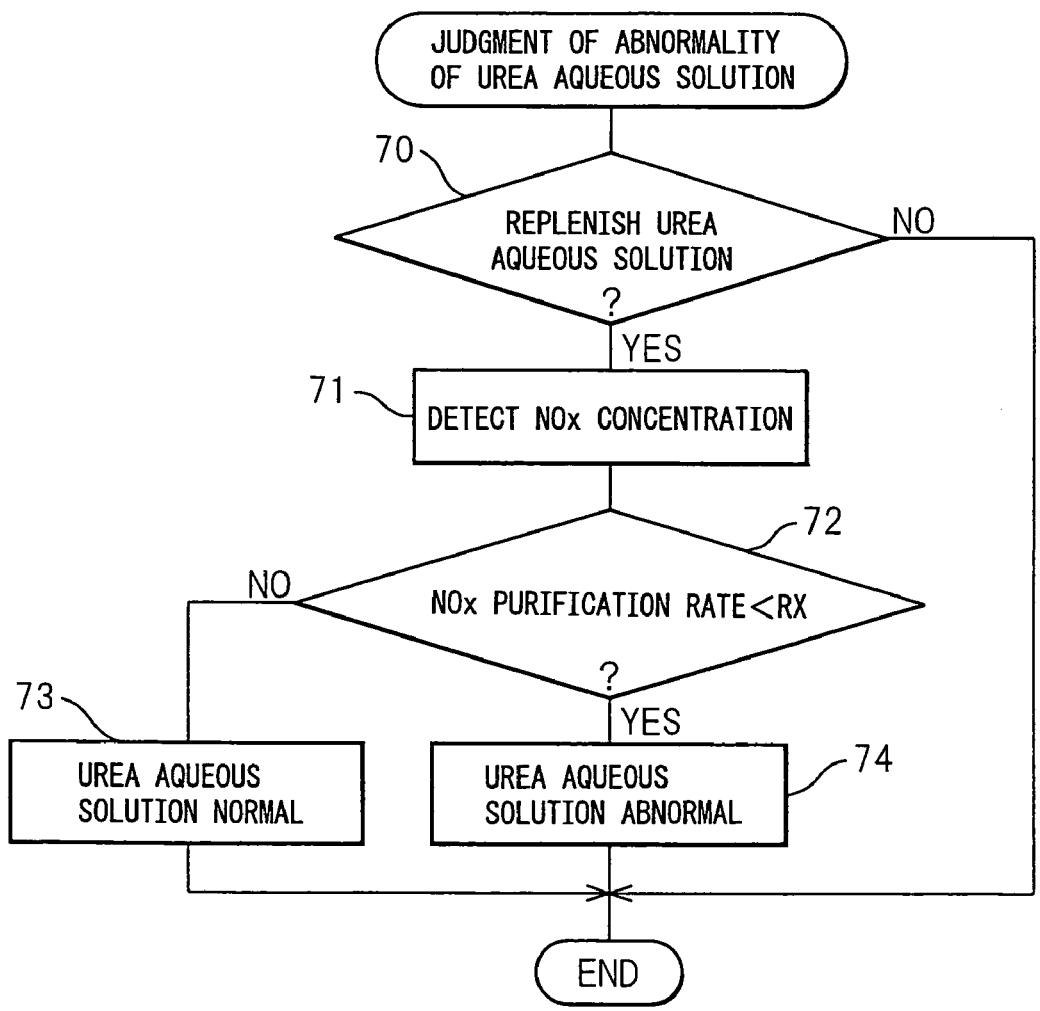
FIG. 4 is a flow chart for judging if a urea aqueous solution is abnormal.

FIG. 4 shows the routine for judgment of an abnormality of the urea aqueous solution executed when the engine starts operating.

Referring to FIG. 4, first, at step 70, it is judged based on the judgment result by the routine shown in FIG. 3(A) or FIG. 3(B) if the urea aqueous solution has been refilled. When the urea aqueous solution has been refilled, the routine proceeds to step 71 where the $NO_x$ concentration in the exhaust gas is detected by the $NO_x$ sensor 43.

For example, if nonstandard low concentration urea aqueous solution is refilled or a liquid with a weak reducing force other than a urea aqueous solution is refilled, the $NO_x$ purification rate in the $NO_x$ selective reduction catalyst 15 will fall, so the $NO_x$ concentration in the exhaust gas guided to the $NO_x$ sensor 43 becomes higher. Therefore, it is judged from the $NO_x$ concentration detected by the $NO_x$ sensor 43 if the $NO_x$ purification rate has fallen below a predetermined allowable level or less. Specifically speaking, the $NO_x$ purification rate is calculated from the amount of $NO_x$ found from the $NO_x$ concentration detected by the $NO_x$ sensor 43 and the amount of exhaust gas, that is, the amount of intake air, and the amount of exhausted $NO_x$ determined from the operating state of the engine. At step 72 of FIG. 4, it is judged if this $NO_x$ purification rate has become the allowable level RX or less. At this time, if the $NO_x$ purification rate$\geq$RX, the routine proceeds to step 73 where it is judged that the urea aqueous solution is normal, while when the $NO_x$ purification rate<RX, the routine proceeds to step 74 where it is judged that the urea aqueous solution is abnormal. In this way, it is detected if the urea aqueous solution is abnormal.

Next, another embodiment of the urea aqueous solution refill judging means will be explained with reference to FIG. 5 to FIG. 7.

Figure 5:
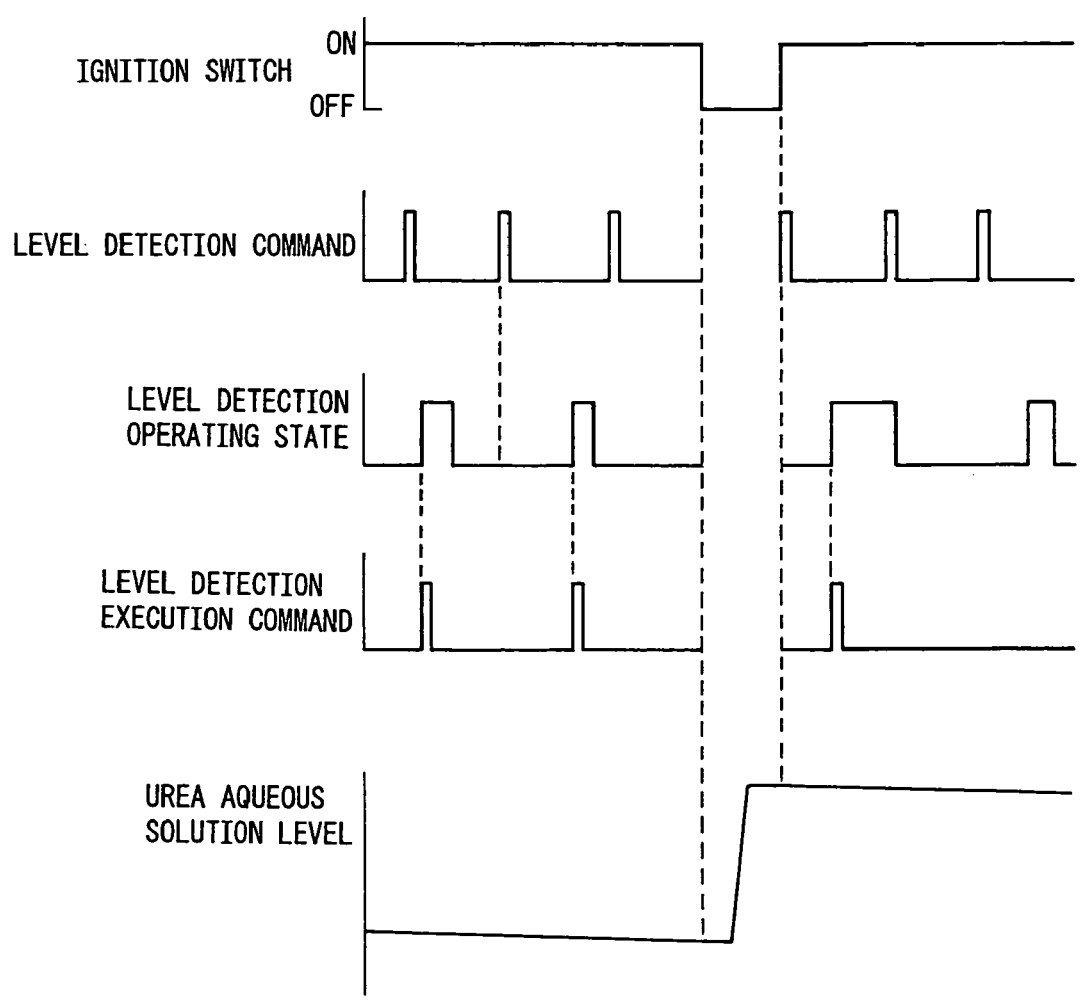
FIG. 5 is a view showing a timing of generation of a level detection execute command etc.
Figure 6:
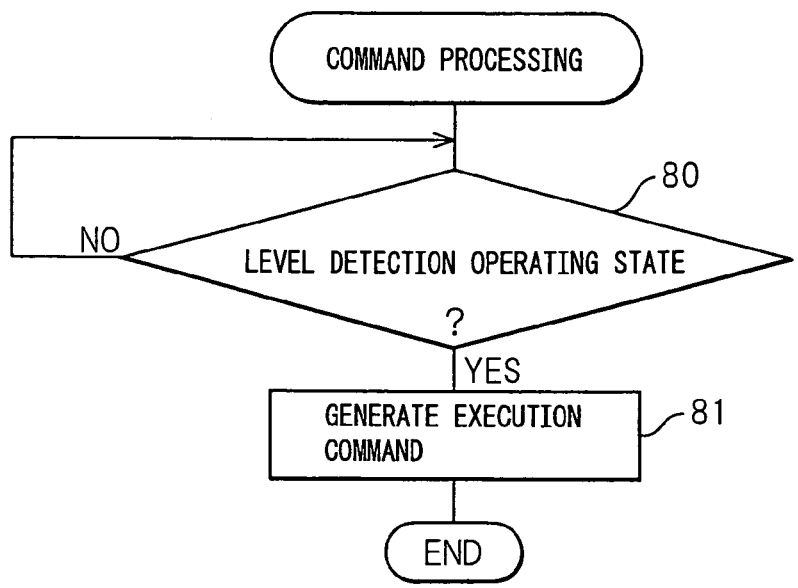
FIG. 6 is a flow chart for performing level detection command processing.

First, if referring to FIG. 5, FIG. 5 shows the on/off state of the ignition switch, the level detection command showing that the liquid level of the urea aqueous solution in the urea aqueous solution tank 20 should be detected by the level sensor 44 shown in FIG. 2, the level detection operation state showing the operating state of the engine which is suitable for detection of the liquid level by the level sensor 44, the level detection execute command issued for executing detection of the liquid level by the level sensor 44, and the liquid level in the urea aqueous solution tank 20, that is, the urea aqueous solution level.

In the example shown in FIG. 5, when the ignition switch is switched from off to on, a level detection command is issued, then, while the ignition switch is on, a level detection command is issued every constant time. When this level detection command is issued, the command processing routine shown in FIG. 6 is executed.

If this command processing routine is executed, to enable the level sensor 44 to accurately detect the liquid level, at step 80, it is judged if the operating state is one where the amount of upward and downward fluctuation of the liquid level of the urea aqueous solution in the urea aqueous solution tank 20 becomes smaller than a predetermined allowable amount of fluctuation, that is, it is judged if the operating state is one where the liquid level of the urea aqueous solution is stabilized. When not an operating state where the liquid level of the urea aqueous solution is stabilized, the routine returns again to step 80. That is, at step 80, it is waited until the liquid level of the urea aqueous solution stabilizes. When the liquid level of the urea aqueous solution stabilizes, the routine proceeds to step 81 where a level detection execute command is issued. That is, as shown in FIG. 5, after the level detection command is issued, when the operating state of the engine is a level detection operating state where the liquid level of the urea aqueous solution first stabilizes, a level detection execute command is issued.

Figure 7:
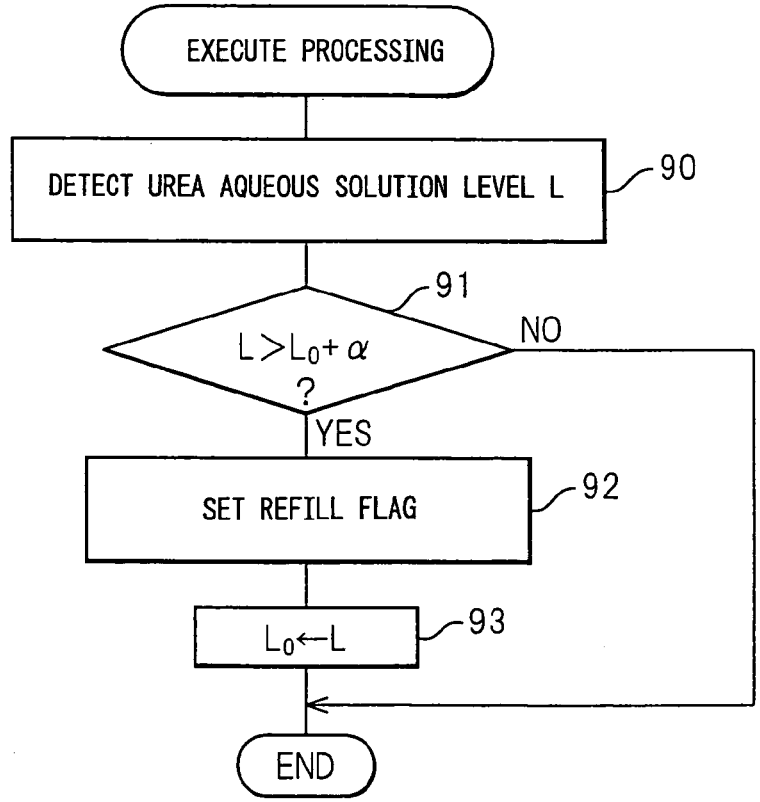
FIG. 7 is a flow chart for performing level detection execute processing.

If a detection execute command is issued, the detection execute processing routine shown in FIG. 7 is executed. That is, first, at step 90, the level sensor 44 detects the level L of the urea aqueous solution in the urea aqueous solution tank 20. Next, at step 91, it is judged if the urea aqueous solution level L has become higher than a constant value α or more with respect to a urea aqueous solution level Lo detected at the time of the previous interruption. When L>Lo+α, it is judged that the solution has been refilled in the urea aqueous solution tank 20 and the routine proceeds to step 92 where the refill flag showing that the refill action has been performed is set. Next, at step 93, the urea aqueous solution level L is made Lo.

In this way, in the present invention, liquid level state judging means for judging the state of the liquid level of the urea aqueous solution in the urea aqueous solution tank 20 and judging means for judging for example if the amount of upward and downward fluctuation of the liquid level of the urea aqueous solution in the urea aqueous solution tank 20 becomes smaller than a predetermined allowable amount of fluctuation are provided and, when judging that the operating state is one where the amount of upward and downward fluctuation of the liquid level of the urea aqueous solution in the urea aqueous solution tank 20 becomes smaller than a predetermined allowable amount of fluctuation in accordance with judgment by this liquid level state judging means, the liquid level in the urea aqueous solution tank 20 is detected by the level sensor 44.

Next, several specific examples of command processing for generating the level detection execute command shown in FIG. 6, that is, several specific examples for judging if the operating state is one where the amount of upward and downward fluctuation of the liquid level of the urea aqueous solution in the urea aqueous solution tank 20 becomes smaller than a predetermined allowable amount of fluctuation, will be explained.

For example, in a vehicle, in the interval from when the ignition switch is turned on to when the starter is operated, the vehicle will not vibrate and the urea aqueous solution tank 20 will not vibrate either. Therefore, in the first example, in the time from when the ignition switch is turned on to when the starter is operated, it is judged that the operating state is one where the amount of upward and downward fluctuation of the liquid level of the urea aqueous solution in the urea aqueous solution tank 20 becomes smaller than a predetermined allowable amount of fluctuation.

Figure 8:
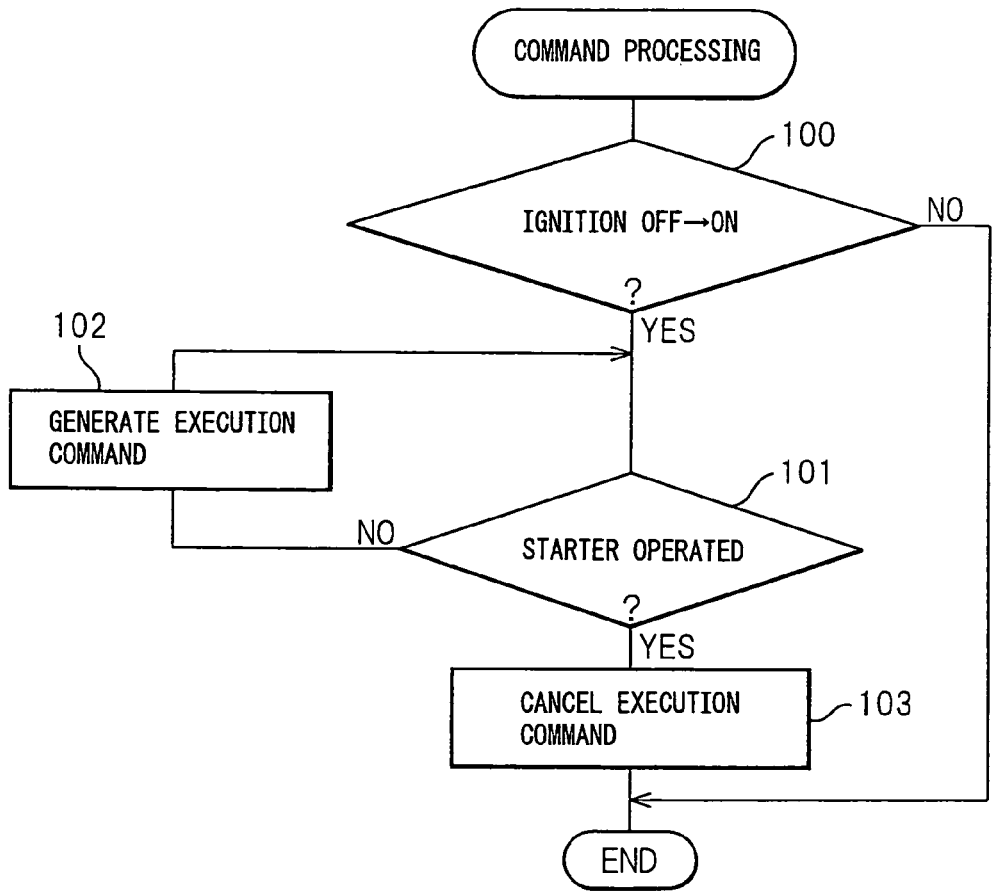
FIG. 8 is a flow chart for performing level detection execute processing.

FIG. 8 shows the command processing for executing this first example.

In this command processing, first, at step 100, it is judged if the ignition switch has been switched from off to on. When the ignition switch is switched from off to on, the routine proceeds to step 101 where it is judged if the starter has been operated or not. When the starter has not been operated, the routine proceeds to step 102 where a level detection execute command is issued, then the routine returns again to step 101. When the starter is operated, the routine proceeds from step 101 to step 103 where the execution command is cancelled.

On the other hand, even when the vehicle is stopped, that is, even when the vehicle speed is zero, the vehicle does not vibrate much at all and the urea aqueous solution tank 20 also does not vibrate much at all. Therefore, in the second example, when the vehicle speed is zero, that is, when the vehicle is stopped, it is judged that the operating state is one where the amount of upward and downward fluctuation of the liquid level of the urea aqueous solution in the urea aqueous solution tank 20 becomes smaller than a predetermined allowable amount of fluctuation.

Figure 9:
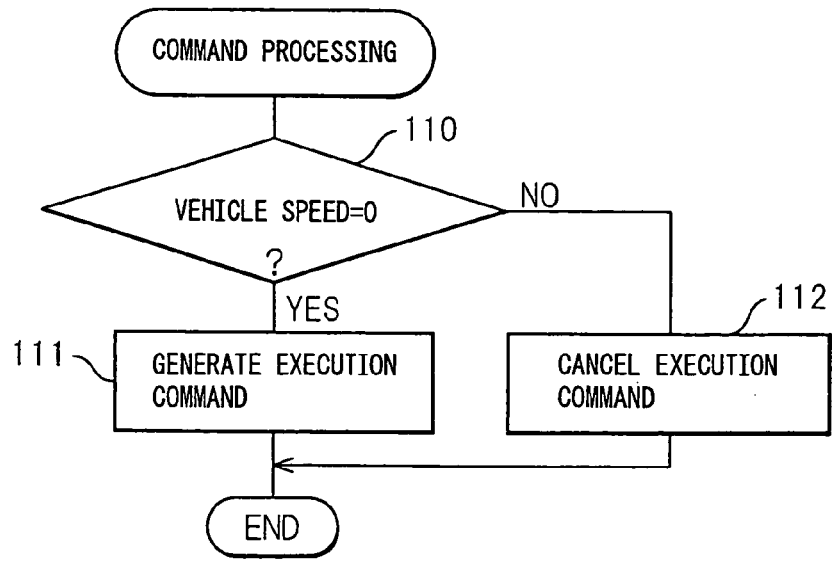
FIG. 9 is a flow chart for performing level detection execute processing.

FIG. 9 shows the command processing for executing this second example.

In this command processing, first, at step 110, it is judged if the vehicle speed is zero. When the vehicle speed is zero, the routine proceeds to step 111 where a level detection execute command is issued. As opposed to this, when it judged at step 110 that the vehicle speed is not zero, the routine proceeds to step 112 where the execution command is cancelled.

Further, even when the vehicle is stopped, immediately after stopping, the urea aqueous solution in the urea aqueous solution tank 20 may violently fluctuate upward and downward. Therefore, in a third example, a level detection execute command is issued only when the vehicle speed is still zero after a fixed time elapses from when the vehicle has stopped.

Figure 10:
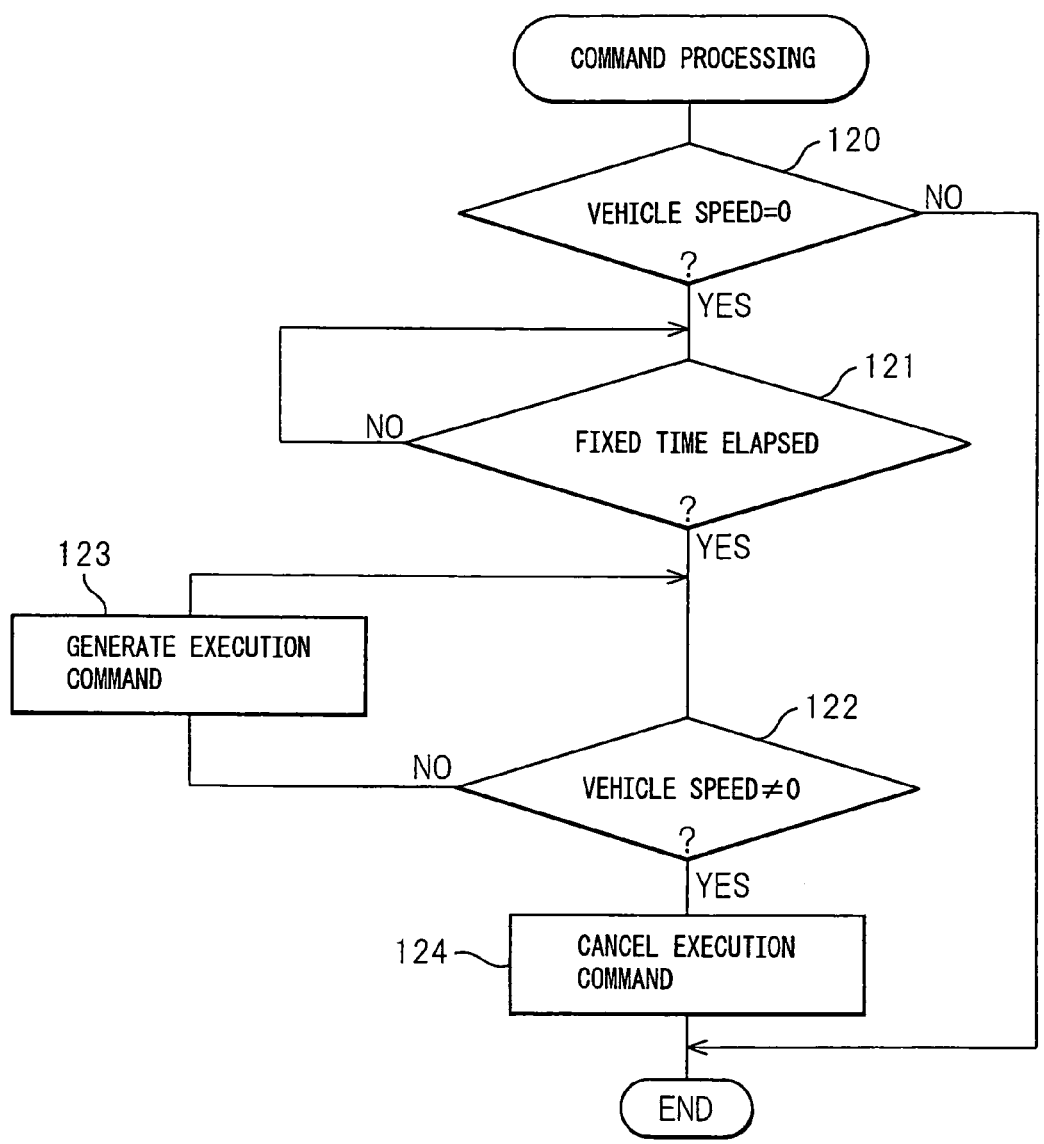
FIG. 10 is a flow chart for performing level detection execute processing.

FIG. 10 shows the command processing for carrying out this third example.

In this command processing, first, at step 120, it is judged if the vehicle speed is zero. When the vehicle speed is zero, the routine proceeds to step 121 where it is judged if a fixed time has elapsed. When the fixed time has elapsed, the routine proceeds to step 122 where it is judged if the vehicle speed is no longer zero. When the vehicle speed is still zero, the routine proceeds to step 123 where a level detection execute command is issued, then the routine returns again to step 122. When the vehicle speed is no longer zero, the routine proceeds from step 122 to step 124 where the execution command is cancelled.

On the other hand, when the acceleration or the deceleration of the vehicle becomes greater, the liquid level of the urea aqueous solution in the urea aqueous solution tank 20 fluctuates. Therefore, in the fourth example, a level detection execute command is issued only when the acceleration and the deceleration are predetermined allowable values or less. Note that in this case, the acceleration and deceleration of the vehicle are detected by an acceleration sensor and deceleration sensor attached to the vehicle.

Figure 11:
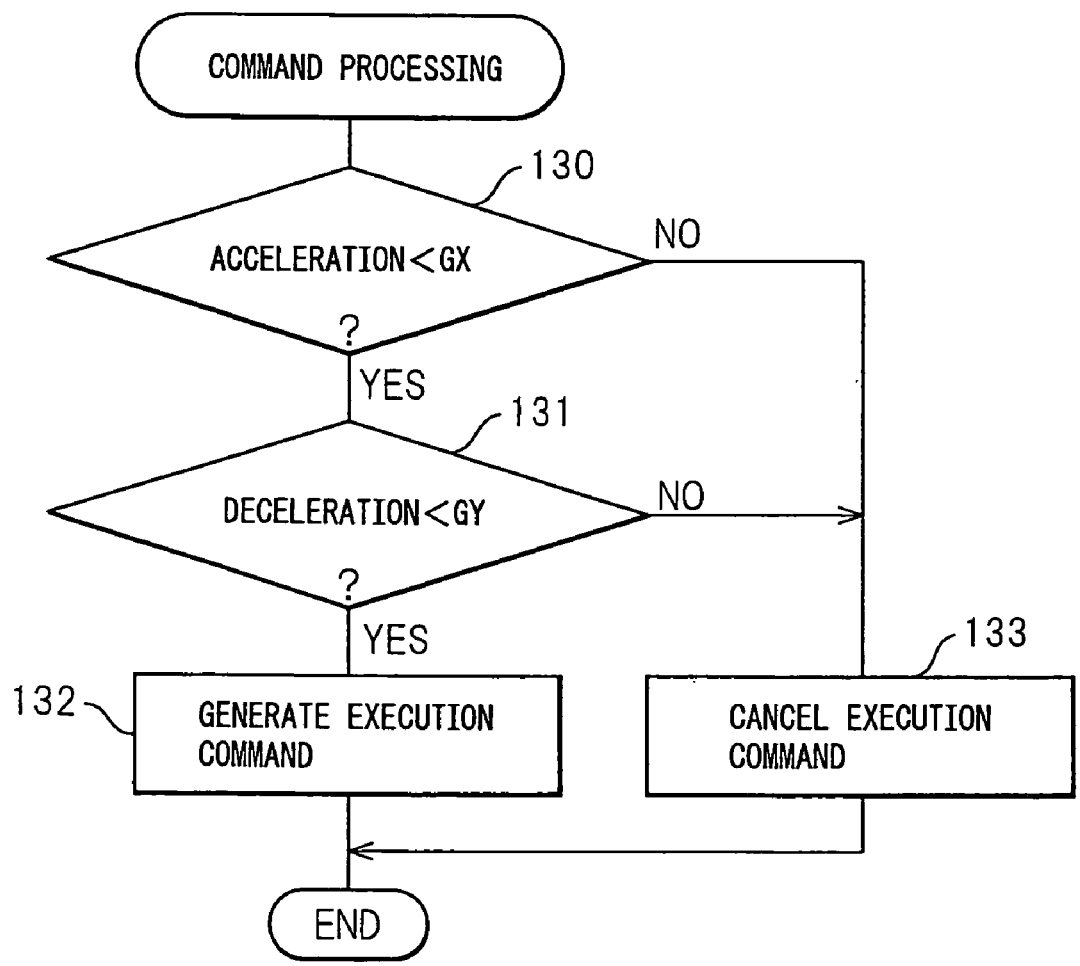
FIG. 11 is a flow chart for performing level detection execute processing.

FIG. 11 shows the command processing for carrying out this fourth example.

In this command processing, first, at step 130, it is judged if the acceleration of the vehicle is an allowable value GX or less. When the acceleration of the vehicle is the allowable value GX or less, the routine proceeds to step 131 where it is judged if the deceleration of the vehicle is the allowable value GY or less. When the deceleration of the vehicle is the allowable value GY or less, the routine proceeds to step 132 where a level detection execute command is issued. As opposed to this, when the acceleration of the vehicle is larger than the allowable value GX or the deceleration of the vehicle is larger than the allowable value GY, the routine proceeds to step 133 where the execution command is cancelled.

On the other hand, when the vehicle is running at a constant vehicle speed for a fixed time or more, the liquid level of the urea aqueous solution in the urea aqueous solution tank 20 probably has stabilized without moving upward or downward much. Therefore, in the fifth example, when the vehicle is running at a constant speed for a fixed time or more, a level detection execute command is issued.

Figure 12:
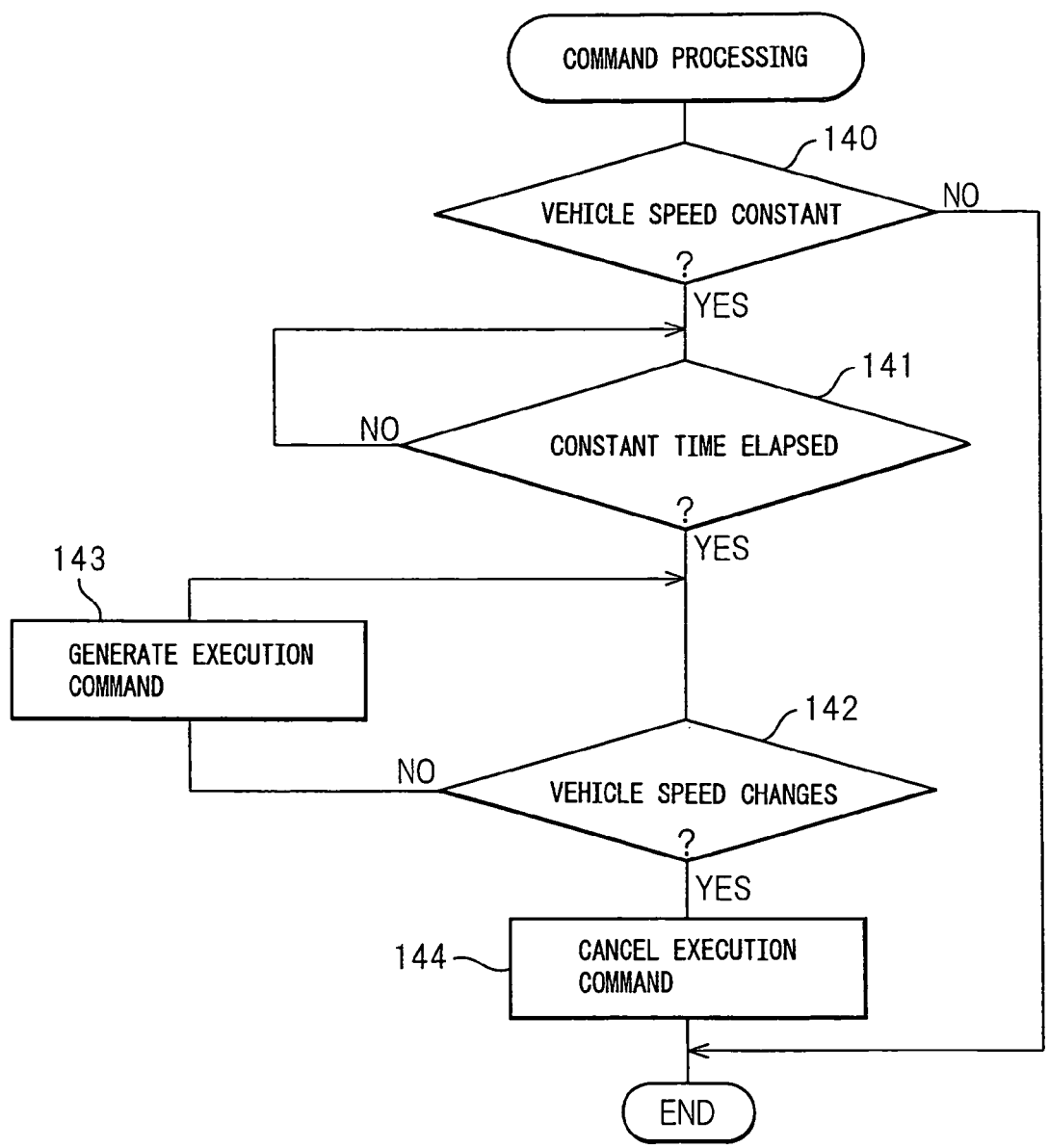
FIG. 12 is a flow chart for performing level detection execute processing.

FIG. 12 shows command processing for carrying out this fifth example.

In this command processing, first, at step 140, it is judged if the vehicle speed has become constant. When the vehicle speed becomes constant, the routine proceeds to step 141, where it is judged if a fixed time has elapsed. When the fixed time has elapsed, the routine proceeds to step 142 where it is judged if the vehicle speed has changed. When the vehicle speed is not changing, the routine proceeds to step 143 where a level detection execute command is issued, then the routine returns again to step 142. When the vehicle speed changes, the routine proceeds from step 142 to step 144 where the execution command is cancelled.

On the other hand, when using the level sensor 44, if the vehicle is inclined from the horizontal plane, the correct liquid level in the urea aqueous solution tank 20 can no longer be detected. Therefore, in this embodiment according to the present invention, the level detection execute command is issued only when the vehicle is being maintained in a horizontal state for a fixed time or more. Note that in this case, it is judged if the vehicle is in a horizontal state by a horizontal detection sensor attached to the vehicle.

Figure 13:
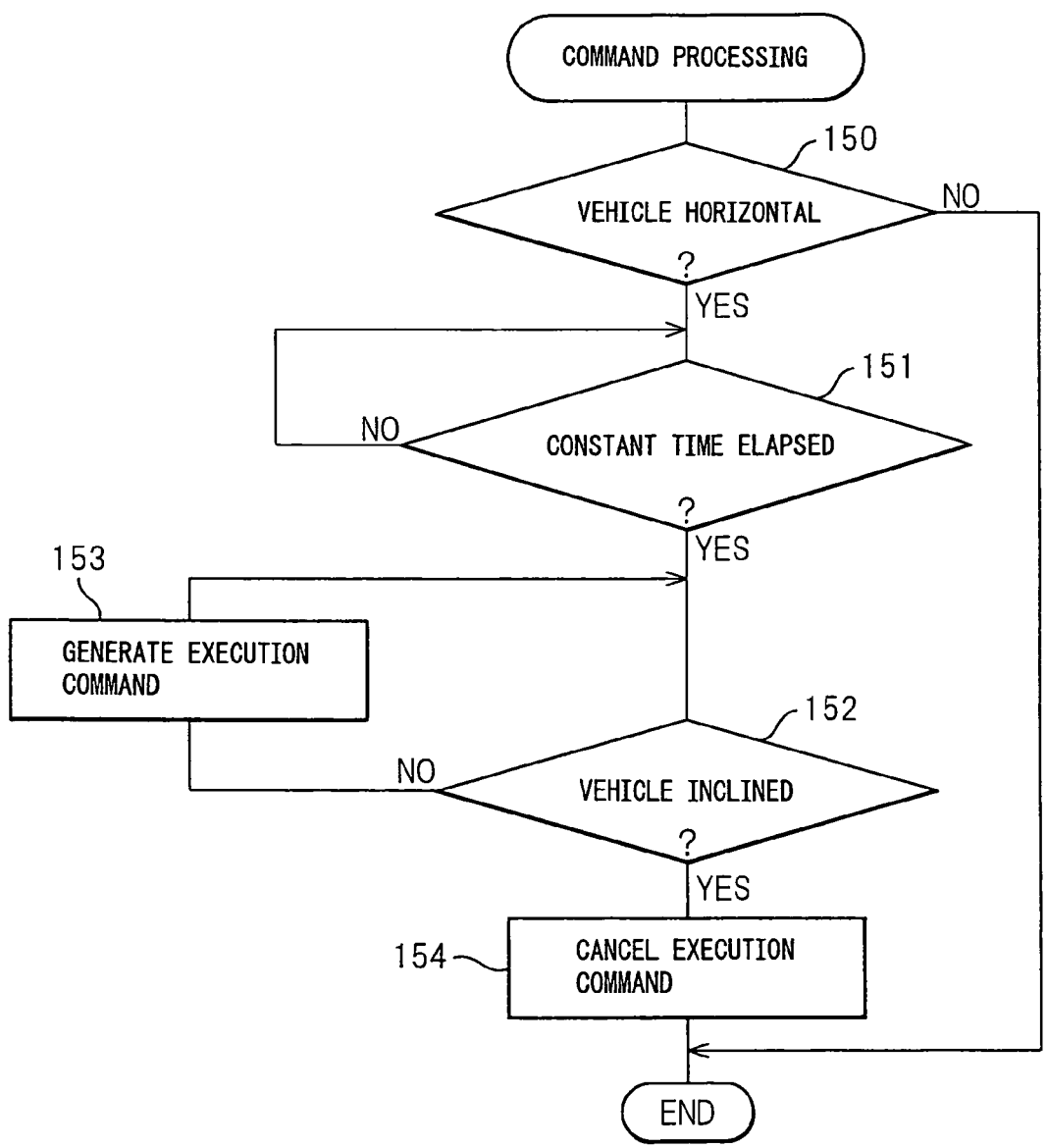
FIG. 13 is a flow chart for performing level detection execute processing.

FIG. 13 shows the command processing for carrying out this embodiment.

In this command processing, first, at step 150, it is judged if the vehicle is in a horizontal state, that is, if the angle of inclination of the vehicle to the horizontal plane is smaller than a predetermined allowable angle of inclination. When the vehicle is in a horizontal state, the routine proceeds to step 151 where it is judged if a fixed time has elapsed. When the fixed time has elapsed, the routine proceeds to step 152 where it is judged if the angle of inclination of the vehicle with respect to the horizontal plane is larger than an allowable angle of inclination, that is, if the vehicle is inclined or not. When the vehicle is inclined, the routine proceeds to step 153 where a level detection execute command is issued, then the routine returns again to step 152. When the vehicle is inclined, the routine proceeds from step 152 to step 154 where the execution command is cancelled.

That is, in this embodiment, it is judged if the operating state is one where the angle of inclination of the liquid level of the urea aqueous solution in the urea aqueous solution tank 20 with respect to the horizontal plane is smaller than a predetermined allowable angle of inclination, and when in an operating state where the angle of inclination of the liquid level in the urea aqueous solution in the urea aqueous solution tank 20 with respect to the horizontal plane becomes smaller than a predetermined allowable angle of inclination, the liquid level in the urea aqueous solution tank 20 is detected by the liquid level sensor.

Next, an embodiment able to be applied to a case where the electronic control unit 30 is kept in an operating state even during refill of the urea aqueous solution, for example, even when the ignition switch is turned off, will be explained. In this embodiment, the level sensor 44 detects when the urea aqueous solution has finished being refilled. In this regard, right after the urea aqueous solution has finished being refilled, the liquid level of the urea aqueous solution in the urea aqueous solution tank is not stable. Therefore, in this embodiment, as shown in FIG. 14(A), after the urea aqueous solution has finished being refilled, a level detection execute command is issued after a fixed time has elapsed.

FIG. 14(B) shows the command processing for carrying out this embodiment.

In this command processing, first, at step 160, it is judged if the urea aqueous solution has finished being refilled. When the urea aqueous solution has finished being refilled, the routine proceeds to step 161 where it is judged if a fixed time has elapsed. When the fixed time has elapsed, the routine proceeds to step 161 where a level detection execute command is issued.

Now, in the urea aqueous solution abnormality judgment routine shown in FIG. 4, when the urea aqueous solution is refilled, the $NO_x$ purification rate in the exhaust gas is detected by the $NO_x$ sensor 43, and when this $NO_x$ purification rate has become an allowable level RX or less, it is judged that the urea aqueous solution is abnormal. However, at this time, if the $NO_x$ selective reduction catalyst 15 is not activated, even if the urea aqueous solution concentration is normal, the $NO_x$ purification rate detected by the $NO_x$ sensor 43 falls. Therefore, in this case, if it is judged that the urea aqueous solution is abnormal when the $NO_x$ purification rate becomes the allowable level RX or lower, it will be a misjudgment.

Therefore, in this embodiment according to the present invention, to prevent such a misjudgment, when the refill flag is set in the level detection execute routine shown in FIG. 7, that is, when it is judged that the urea aqueous solution has been refilled in the urea aqueous solution tank 20, it is judged if the $NO_x$ selective reduction catalyst 15 is activated, and when it is judged that the $NO_x$ selective reduction catalyst 15 is activated, it is judged if the $NO_x$ purification rate has fallen to an allowable level RX or less.

Note that to enable the $NO_x$ sensor 43 to accurately detect the $NO_x$ purification rate, the time of steady state operation where the amount of change of the $NO_x$ exhausted from the engine is small and the amount of adsorption of the ammonia at the $NO_x$ selective reduction catalyst 15 is stable is preferable. Therefore, in this embodiment according to the present invention, the $NO_x$ purification rate is detected by the $NO_x$ sensor 43 at the time of steady state operation.

Figure 15:
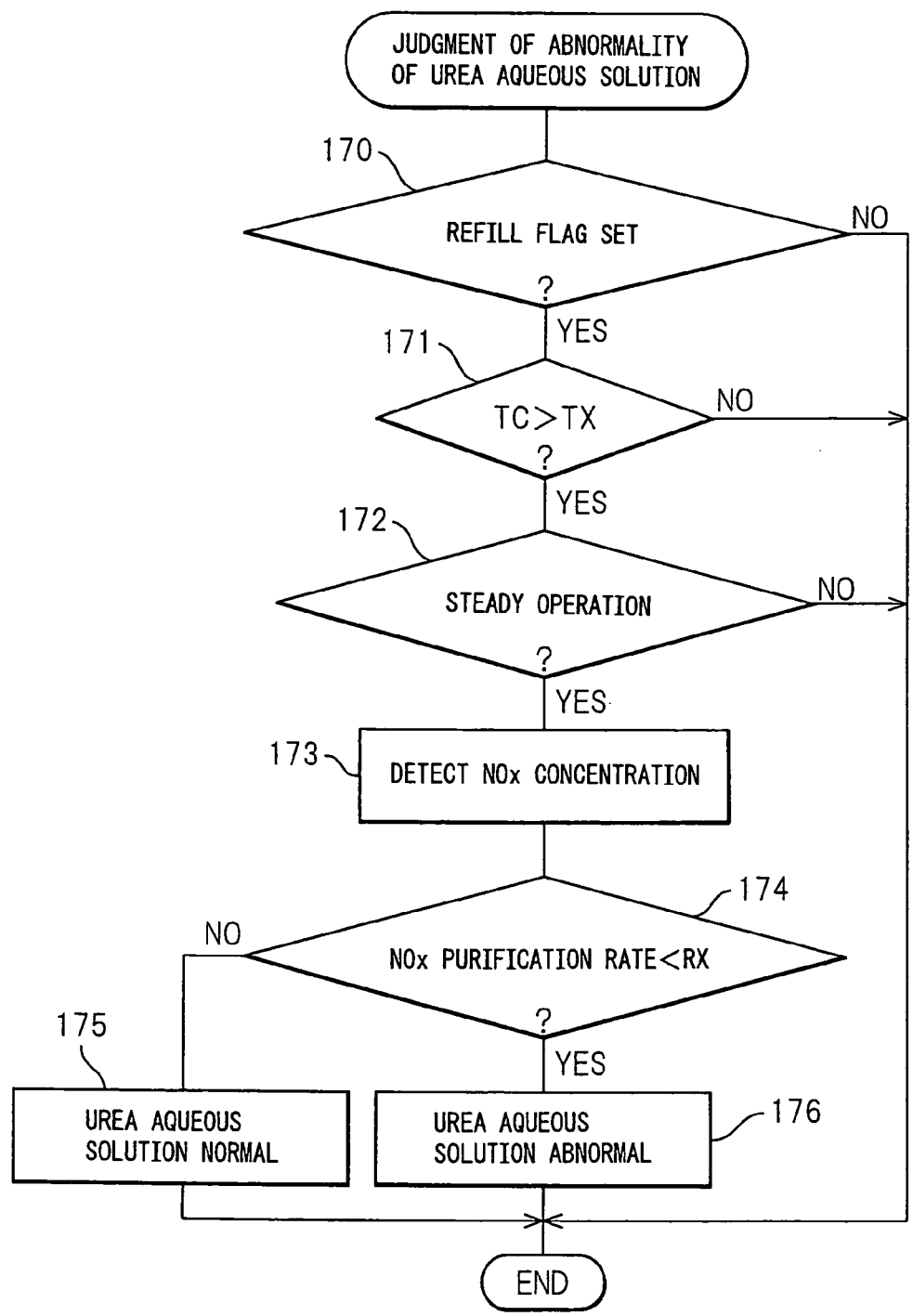
FIG. 15 is a flow chart for judging an abnormality of a urea aqueous solution.

FIG. 15 shows an abnormality judgment routine of a urea aqueous solution for executing this embodiment.

Referring to FIG. 15, first, at step 170, it is judged if a refill flag showing that the urea aqueous solution has been refilled has been set. When the refill flag has been set, the routine proceeds to step 171 where it is judged if the temperature TC of the $NO_x$ selective reduction catalyst 15 has become an activation temperature TX or more. When TC>TX, that is, when the $NO_x$ selective reduction catalyst 15 is activated, the routine proceeds to step 172 where it is judged if the engine is in a steady state operation. At the time of steady state operation, the routine proceeds to step 173.

At step 173, the $NO_x$ concentration in the exhaust gas is detected by the $NO_x$ sensor 43, and the $NO_x$ purification rate is calculated from this $NO_x$ concentration. Next, at step 174, it is judged if the $NO_x$ purification rate has become an allowable level RX or less. At this time, if $NO_x$ purification rate≧RX, the routine proceeds to step 175 where it is judged that the urea aqueous solution is normal and the refill flag is reset. As opposed to this, when at this time the $NO_x$ purification rate<RX, the routine proceeds to step 176 where it is judged that the urea aqueous solution is abnormal and the refill flag is reset.

Further, when judging an abnormality of the urea aqueous solution, if urea aqueous solution before refill remains inside the urea aqueous solution feed valve 17 for feeding the urea aqueous solution and inside the feed pipe 18 of the urea aqueous solution connected to the urea aqueous solution feed valve 17, abnormality of the urea aqueous solution before refill will end up being judged.

Therefore, in this embodiment of the present invention, to enable judgment of abnormality of the urea aqueous solution after refill, when it is judged that the urea aqueous solution has been refilled in the urea aqueous solution tank 20, it is judged if urea aqueous solution before refill remains inside the urea aqueous solution feed valve 17 for feeding the urea aqueous solution and inside the feed pipe 18 of the urea aqueous solution connected to the urea aqueous solution feed valve 17, and when it is judged that urea aqueous solution before refill does not remain inside the urea aqueous solution feed valve 17 and inside the feed pipe 18 of the urea aqueous solution, it is judged if the $NO_x$ purification rate has fallen to the allowable level RX or less.

In this case, in the first example, when finding the cumulative value Q of the amount of feed of the urea aqueous solution from the urea aqueous solution feed valve 17 after refill and this cumulative value Q exceeds the maximum residual urea aqueous solution amount $Q_0$ able to remain inside the urea aqueous solution feed valve 17 and inside the urea aqueous solution feed pipe 18, it is judged that urea aqueous solution before refill does not remain inside the urea aqueous solution feed valve 17 and inside the urea aqueous solution feed pipe 18.

Figure 16:
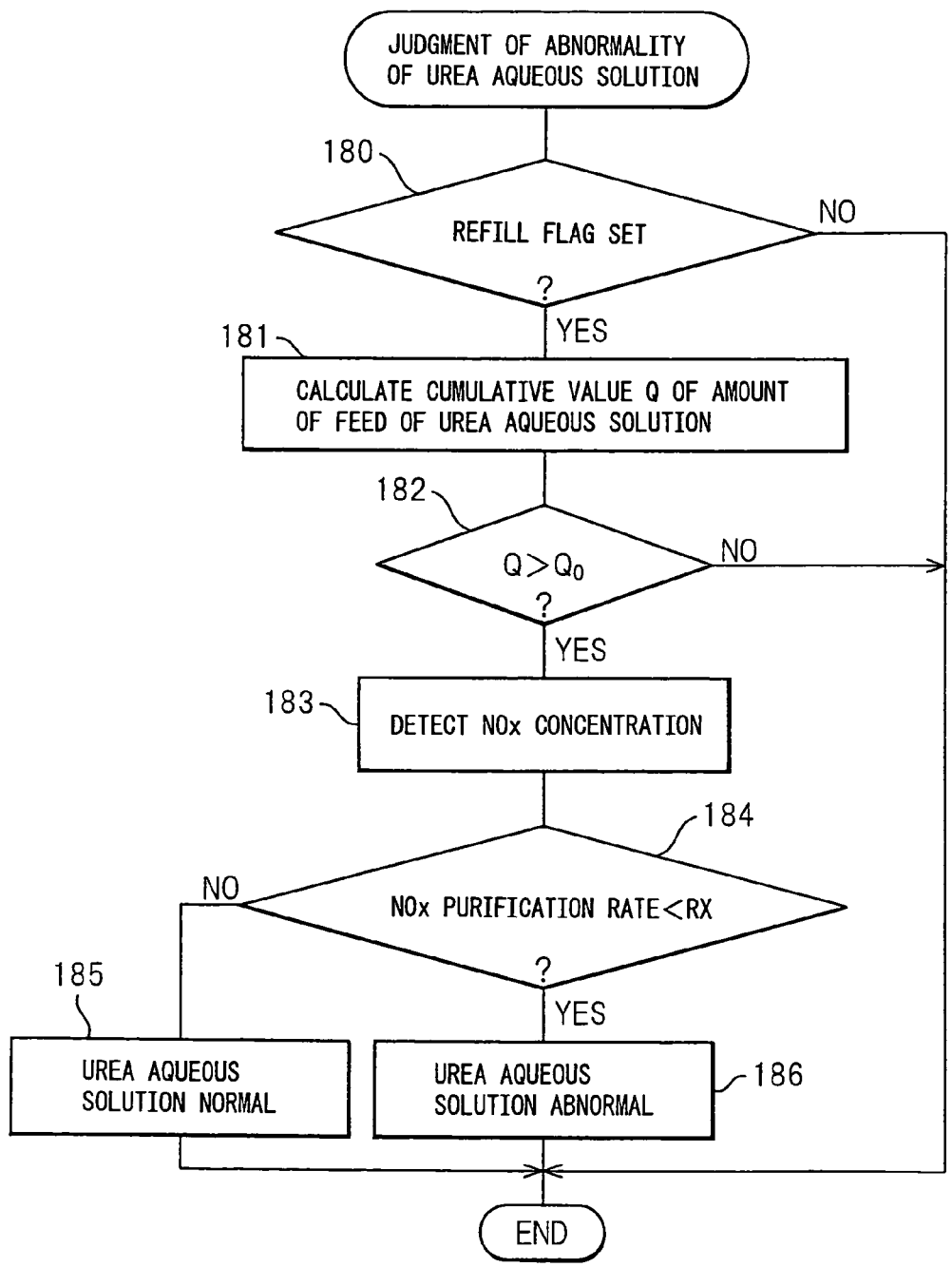
FIG. 16 is a flow chart for judging an abnormality of a urea aqueous solution.

FIG. 16 shows a routine for judging abnormality of the urea aqueous solution for executing this first example.

Referring to FIG. 16, first, at step 180, it is judged if a refill flag showing that the urea aqueous solution has been refilled is set. When the refill flag is set, the routine proceeds to step 181 where the cumulative amount Q of the amount of feed of urea aqueous solution fed after refill is calculated. Next, at step 182, it is judged if the cumulative value Q is larger than the maximum residual urea amount $Q_0$. When Q>$Q_0$, the routine proceeds to step 183.

At step 183, the $NO_x$ concentration in the exhaust gas us detected by the $NO_x$ sensor 43, and the $NO_x$ purification rate is calculated from this $NO_x$ concentration. Next, at step 184, it is judged if the $NO_x$ purification rate has become the allowable level RX or less. At this time, when $NO_x$ purification rate≧RX, the routine proceeds to step 185 where it is judged that the urea aqueous solution is normal and the refill flag is reset. As opposed to this, when $NO_x$ purification rate<RX at this time, the routine proceeds to step 186 where it is judged that the urea aqueous solution is abnormal and the refill flag is reset.

On the other hand, in the second example, when the urea aqueous solution finishes being refilled, the feed pump 19 is operated in reverse and the urea aqueous solution before refill remaining inside the urea aqueous solution feed valve 17 and inside the urea aqueous solution feed pipe 18 is sucked out into the urea aqueous solution tank 20. The amount of this sucked out urea is smaller than the amount of refilled urea aqueous solution, so has no effect on the concentration of the refilled urea aqueous solution. In this second example, when the suck out action of the residual urea aqueous solution has been completed, abnormality of the urea aqueous solution is judged based on the detection value of the $NO_x$ sensor 43.

FIG. 17 shows the routine for judgment of an abnormality of the urea aqueous solution for executing this second example.

Referring to FIG. 17, first, at step 190, it is judged if a refill flag showing that the urea aqueous solution has been refilled is set. When the refill flag is set, the routine proceeds to step 191 where the action of sucking out urea aqueous solution before refill, which remains inside the urea aqueous solution feed valve 17 and inside the urea aqueous solution feed pipe 18, is performed. Next, at step 192, it is judged if this action of sucking out the urea aqueous solution has been already completed. When the action of sucking out the urea aqueous solution has already been completed, the routine proceeds to step 193.

At step 193, the $NO_x$ concentration in the exhaust gas is detected by the $NO_x$ sensor 43 and the $NO_x$ purification rate is calculated from this $NO_x$ concentration. Next, step 194, it is judged if the $NO_x$ purification rate has become the allowable level RX or less. At this time, if $NO_x$ purification rate$\geq$RX, the routine proceeds to step 195 where it is judged that the urea aqueous solution is normal and the refill flag is reset. As opposed to this, when $NO_x$ purification rate<RX at this time, the routine proceeds to step 196 where it is judged that the urea aqueous solution is abnormal and the refill flag is reset.

DESCRIPTION OF NOTATIONS

4 . . . intake manifold
5 . . . exhaust manifold
12,16 . . . oxidation catalyst
13 . . . particulate filter
15 . . . $NO_x$ selective reduction catalyst
17 . . . urea aqueous solution feed valve
20 . . . urea aqueous solution tank
40 . . . urea aqueous solution refill port
41 . . . cap
42 . . . switch
43 . . . $NO_x$ sensor
44 . . . level sensor

The invention claimed is:

1. An exhaust purification device of an internal combustion engine arranging an $NO_x$ selective reduction catalyst in an engine exhaust passage, feeding a urea aqueous solution stored in a urea aqueous solution tank to the $NO_x$ selective reduction catalyst, and using ammonia produced from the urea aqueous solution to selectively reduce $NO_x$ contained in an exhaust gas, wherein urea aqueous solution refill judging means for judging if the urea aqueous solution has been refilled in the urea aqueous solution tank and $NO_x$ purification rate judging means for judging if the $NO_x$ purification rate has fallen to an allowable level or less are provided and, urea aqueous solution abnormality judging means for judging if the refilled urea aqueous solution is abnormal when it is judged that the $NO_x$ purification rate has fallen to the allowable level or less at the time of engine operation right after the urea aqueous solution has been refilled in the urea aqueous solution tank.

2. The exhaust purification device of an internal combustion engine as claimed in claim 1, wherein opening and closing of a urea aqueous solution refill port of the urea aqueous solution tank are detected and it is judged that the urea aqueous solution is refilled when the urea aqueous solution refill port is opened and closed.

3. The exhaust purification device of an internal combustion engine as claimed in claim 1, wherein a liquid level of the urea aqueous solution in the urea aqueous solution tank is detected and it is judged that the urea aqueous solution has been refilled when the liquid level of the urea aqueous solution rises from a predetermined low level or less and exceeds a predetermined refill completion level.

4. The exhaust purification device of an internal combustion engine as claimed in claim 3, wherein liquid level state judging means for judging a state of the liquid level of the urea aqueous solution in the urea aqueous solution tank is provided and the liquid level in the urea aqueous solution tank is detected by a level sensor in accordance with a judgment by the liquid level state judging means.

5. The exhaust purification device of an internal combustion engine as claimed in claim 4, wherein said liquid level state judging means judges if an operating state is one where an amount of upward and downward fluctuation of the liquid level of the urea aqueous solution in the urea aqueous solution tank becomes smaller than a predetermined allowable amount of fluctuation and, when the operating state is one where the amount of upward and downward fluctuation of the liquid level of the urea aqueous solution in the urea aqueous solution tank becomes smaller than the predetermined allowable amount of fluctuation, the liquid level of the urea aqueous solution tank is detected by the level sensor.

6. The exhaust purification device of an internal combustion engine as claimed in claim 5, wherein in an interval from when an ignition switch is turned on to when a starter is operated, it is judged that the operating state is one where the amount of upward and downward fluctuation of the liquid level of the urea aqueous solution in the urea aqueous solution tank becomes smaller than the predetermined allowable amount of fluctuation.

7. The exhaust purification device of an internal combustion engine as claimed in claim 5, wherein when a vehicle is stopped, it is judged that the operating state is one where the amount of upward and downward fluctuation of the liquid level of the urea aqueous solution in the urea aqueous solution tank becomes smaller than the predetermined allowable amount of fluctuation.

8. The exhaust purification device of an internal combustion engine as claimed in claim 4, wherein said liquid level state judging means judges if the operating state is one where an angle of inclination of a vehicle with respect to a horizontal plane becomes smaller than a predetermined allowable angle of inclination and, when the operating state is one where the angle of inclination of the vehicle with respect to the horizontal plane becomes smaller than the predetermined allowable angle of inclination, the liquid level inside the urea aqueous solution tank is detected by the level sensor.

9. The exhaust purification device of an internal combustion engine as claimed in claim 1, wherein when said urea aqueous solution refill judging means judges that the urea aqueous solution is refilled inside the urea aqueous solution tank, it is judged if the $NO_x$ selective reduction catalyst is activated and, when it is judged that the $NO_x$ selective reduction catalyst is activated, said $NO_x$ purification rate judging means judges that the $NO_x$ purification rate has fallen to the allowable level or less.

10. The exhaust purification device of an internal combustion engine as claimed in claim 1, wherein when said urea aqueous solution refill judging means judges that the urea aqueous solution is refilled in the urea aqueous solution tank, it is judged if a urea aqueous solution before refill remains inside a urea aqueous solution feed valve for feeding the urea aqueous solution and inside a urea aqueous solution feed pipe connected to the urea aqueous solution feed valve and, when it is judged that the urea aqueous solution before refill does not remain inside the urea aqueous solution feed valve and inside the urea aqueous solution feed pipe, said $NO_x$ purification rate judging means judges if the $NO_x$ purification rate has fallen to the allowable level or less.

11. The exhaust purification device of an internal combustion engine as claimed in claim 1, further comprising:
a level sensor that detects a liquid level of the urea aqueous solution in the urea aqueous solution tank; and
a urea aqueous solution liquid level fluctuation acquisition unit that acquires an amount of fluctuation of the liquid level of the urea aqueous solution in the urea aqueous solution tank on the basis of the liquid level of the urea aqueous solution, detected by the urea aqueous solution liquid level detecting unit,
wherein the urea aqueous solution refill judging unit judges that the urea aqueous solution has been refilled when the amount of fluctuation of the liquid level of the urea aqueous solution, acquired by the urea aqueous solution liquid level fluctuation acquisition unit, is an amount of upward fluctuation larger than or equal to a predetermined amount.

12. The exhaust purification device of an internal combustion engine as claimed in claim 11, wherein the urea aqueous solution refill judging unit judges that the urea aqueous solution has been refilled to the urea aqueous solution tank when the liquid level of the urea aqueous solution in the urea aqueous solution tank, detected by the urea aqueous solution liquid level detecting unit, is lower than or equal to a first predetermined level and then becomes higher than or equal to a second predetermined level that is higher than the first predetermined level.

13. The exhaust purification device of an internal combustion engine as claimed in claim 1, further comprising:
a urea aqueous solution refill port opening and closing detecting unit that detects opening and closing of a urea aqueous solution refill port of the urea aqueous solution tank,
wherein the urea aqueous solution refill judging unit judges that the urea aqueous solution has been refilled to the urea aqueous solution tank when opening and closing of the urea aqueous solution refill port has been detected by the urea aqueous solution refill port opening/closing detecting unit.

14. The exhaust purification device of an internal combustion engine as claimed in claim 13, wherein the urea aqueous solution refill judging unit judges that the urea aqueous solution has been refilled to the urea aqueous solution tank when the liquid level of the urea aqueous solution in the urea aqueous solution tank, detected by the urea aqueous solution liquid level detecting unit, is lower than or equal to a first predetermined level and then becomes higher or equal to a second predetermined level that is higher than the first predetermined level.

* * * * *